(12) United States Patent
Chen et al.

(10) Patent No.: US 12,730,364 B2
(45) Date of Patent: Sep. 8, 2026

(54) ACTUATING APPARATUS AND PROJECTOR

(71) Applicant: Coretronic Corporation, Hsin-Chu (TW)

(72) Inventors: Wei-Hao Chen, Hsin-Chu (TW); Ken-Teng Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 238 days.

(21) Appl. No.: 18/762,683

(22) Filed: Jul. 3, 2024

(65) Prior Publication Data

US 2025/0035922 A1 Jan. 30, 2025

(30) Foreign Application Priority Data

Jul. 25, 2023 (CN) ........................ 202310915061.X

(51) Int. Cl.
*G03B 21/14* (2006.01)

(52) U.S. Cl.
CPC ........... *G03B 21/142* (2013.01); *G03B 21/14* (2013.01)

(58) Field of Classification Search
CPC .............................. G03B 21/142; G03B 21/14
See application file for complete search history.

(56) References Cited

U.S. PATENT DOCUMENTS

2005/0264501 A1* 12/2005 Choi ...................... G09G 3/002 345/84
2005/0264547 A1* 12/2005 Choi ...................... H04N 9/317 345/204
2005/0275810 A1* 12/2005 Choi .................... G03B 21/005 353/69
2006/0007057 A1* 1/2006 Choi .................... H04N 9/3179 345/9
2016/0004071 A1* 1/2016 Mizoguchi ........... H04N 9/3188 359/198.1
2016/0094819 A1* 3/2016 Mizoguchi ......... G02B 26/0875 359/199.3
2016/0124216 A1* 5/2016 Kojima ................ G02B 26/105 156/60

(Continued)

FOREIGN PATENT DOCUMENTS

CN 110133857 9/2021
CN 216083378 3/2022

*Primary Examiner* — Bao-Luan Q Le
(74) *Attorney, Agent, or Firm* — JCIPRNET

(57) ABSTRACT

An actuating apparatus configured to allow an image light beam to pass through. The actuating apparatus includes a frame body, an optical element, a light-transmitting element, and a drive assembly. The frame body includes a first frame portion, a second frame portion, and a shaft portion. The first frame portion is connected to the second frame portion through the shaft portion. A through hole of the second frame has a first opening and a second opening. The optical element is disposed on the first frame portion and located in the first opening. The light-transmitting element is disposed on the second frame portion, and is located in the second opening to seal the second opening. The image light beam sequentially passes through the optical element and the light-transmitting element. The drive assembly is disposed on the frame body and drives the first frame portion to rotate with the shaft portion.

14 Claims, 9 Drawing Sheets

(56) References Cited

U.S. PATENT DOCUMENTS

2016/0124217 A1* 5/2016 Kojima ................ G02B 26/085
359/199.1
2016/0363840 A1* 12/2016 Mizoguchi ............. G09G 3/002
2016/0370575 A1* 12/2016 Lin ...................... G02B 26/085
2017/0104965 A1* 4/2017 Kadotani ............. G03B 21/142
2017/0299883 A1* 10/2017 Nonaka ................ G03B 21/142
2018/0011285 A1* 1/2018 Aschwanden ....... G02B 7/1821
2018/0047321 A1* 2/2018 Hirakura .............. H04N 9/3188
2018/0095269 A1* 4/2018 Mizoguchi ........... G03B 21/142
2019/0196308 A1* 6/2019 Chang .................... G02B 7/005
2019/0235364 A1* 8/2019 Chen .................. G02B 26/0833
2020/0159093 A1* 5/2020 Wakabayashi ....... G01D 3/0365
2020/0159094 A1* 5/2020 Wakabayashi ......... H02K 33/16
2020/0174246 A1* 6/2020 Wakabayashi ....... G03B 21/006
2020/0363707 A1* 11/2020 Hirakura .............. G03B 21/142
2020/0371402 A1* 11/2020 Hirakura ............ G02B 26/0833
2020/0371405 A1* 11/2020 Yanagihara .......... H04N 9/3188
2020/0386986 A1* 12/2020 Chen .................... G02B 26/101
2021/0026230 A1* 1/2021 Liu ........................ H04N 9/317
2021/0096449 A1* 4/2021 Hirakura ............... H01F 7/0205
2021/0200071 A1* 7/2021 Chang .................. G03B 21/145
2021/0247671 A1* 8/2021 Wakabayashi ..... G03B 21/2066
2021/0294094 A1* 9/2021 Wakabayashi ....... G02B 27/141
2022/0132084 A1* 4/2022 Yanagisawa ....... G02B 26/0875
2022/0137492 A1* 5/2022 Chen .................. G03B 21/2066
353/98
2022/0163756 A1* 5/2022 Wakabayashi ....... H04N 23/687
2022/0163829 A1* 5/2022 Wakabayashi ......... G02B 26/08
2022/0252828 A1* 8/2022 Chen .................... G02B 7/1821
2022/0299848 A1* 9/2022 Ito ........................ H04N 9/3105
2023/0089186 A1* 3/2023 Takada ............... G02B 26/0816
359/221.2
2024/0168235 A1* 5/2024 Kadotani ............... G03B 21/16

* cited by examiner

ACTUATING APPARATUS AND PROJECTOR

CROSS-REFERENCE TO RELATED APPLICATION

This application claims the priority benefit of China application serial no. 202310915061.X, filed on Jul. 25, 2023. The entirety of the above-mentioned patent application is hereby incorporated by reference herein and made a part of this specification.

BACKGROUND

Technical Field

This disclosure relates to an actuating apparatus and a projector, and in particular to an actuating apparatus with dust-proof effect and a projector using the actuating apparatus.

Description of Related Art

Generally speaking, if there is a need for dust-proofing of the projector's optical engine, a dust-proof glass structure will be added to the outside of the optical engine near the lens, so that no dust will enter the internal part of the optical engine when the lens is replaced. If an actuator is fitted to the optical engine, it is placed between the prism assembly and the dust-proof glass structure to maintain the dust-proof effect. Currently, the dust-proof glass structure mainly includes a dust-proof cover and dust-proof glass, in which if there is no dust-proof cover, the size of the required dust-proof glass would need to be larger than the opening of the optical engine. Thus, by adding a dust-proof cover, it is only necessary to leave the light path to pass through the required aperture size, which can effectively reduce the size of the dust-proof glass. However, either increasing the size of the dust-proof glass or adding a dust-proof cover will increase the production cost of the projector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides an actuating apparatus with a light-transmitting element having a dust-proof effect, which may reduce a component (e.g., a dust-proof cover) in the existing technology and does not need to increase a size of dust-proof glass, thereby effectively reducing costs.

The disclosure further provides a projector including the actuating apparatus, which may save production costs.

Other objects and advantages of the disclosure can be further understood from the technical features disclosed in the disclosure.

In order to achieve one or part or all of the above objectives or other objectives, an embodiment of the disclosure provides an actuating apparatus configured to allow an image light beam to pass through. The actuating apparatus includes a frame body, an optical element, a light-transmitting element, and a drive assembly. The frame body includes a first frame portion, a second frame portion, and a shaft portion. The first frame portion is connected to the second frame portion through the shaft portion. The second frame portion has a through hole. The through hole has a first opening and a second opening. The first frame portion is located in the first opening. The optical element is disposed on the first frame portion and is located in the first opening. The light-transmitting element is disposed on the second frame portion, and is located in the second opening to seal the second opening. The image light beam sequentially passes through the optical element located in the first opening and the light-transmitting element located in the second opening. The drive assembly is disposed on the frame body, and the drive assembly drives the first frame portion to rotate with the shaft portion as an axis of rotation, so that the first frame portion drives the optical element to oscillate back and forth relative to the second frame portion.

To achieve one or part or all of the above objectives or other objectives, an embodiment of the disclosure provides a projector including an illumination system, an optical engine assembly, a projection lens, and an actuating apparatus. The illumination system is configured to provide an illumination light beam. The optical engine assembly is configured to convert the illumination light beam into an image light beam. The projection lens is configured to project the image light beam outside the projector. The actuating apparatus is disposed between the optical engine assembly and the projection lens to allow the image light beam to pass through. The actuating apparatus includes a frame body, an optical element, a light-transmitting element, and a drive assembly. The frame body includes a first frame portion, a second frame portion, and a shaft portion. The first frame portion is connected to the second frame portion through the shaft portion. The second frame has a through hole. The through hole has a first opening and a second opening. The first frame portion is located in the first opening. The optical element is disposed on the first frame portion and is located in the first opening. The light-transmitting element is disposed on the second frame portion, and is located in the second opening to seal the second opening. The image light beam sequentially passes through the optical element located in the first opening and the light-transmitting element located in the second opening. The second frame portion and the light-transmitting element seal an opening at a light-emitting side of the optical engine assembly. The drive assembly is disposed on the frame body, and the drive assembly drives the first frame portion to rotate with the shaft portion as an axis of rotation, so that the first frame portion drives the optical element to oscillate back and forth relative to the second frame portion.

Based on the above, the embodiments of the disclosure have at least one of the following advantages or functions. In the design of the actuating apparatus of the disclosure, the optical element is disposed on the first frame portion of the frame body and is located in the first opening. The light-transmitting element is disposed on the second frame portion of the frame body and is located in the second opening to seal the second opening. The provision of the light-transmitting element enables the actuating apparatus itself to have a dust-proof effect, which may reduce a component (e.g., a dust-proof cover) in the existing technology and does not need to increase a size of dust-proof glass, thereby effectively reducing costs. In addition, the projector using the actuating apparatus of the disclosure may save production costs.

Other objectives, features and advantages of the disclosure will be further understood from the further technological features disclosed by the embodiments of the disclosure where in there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or 'having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
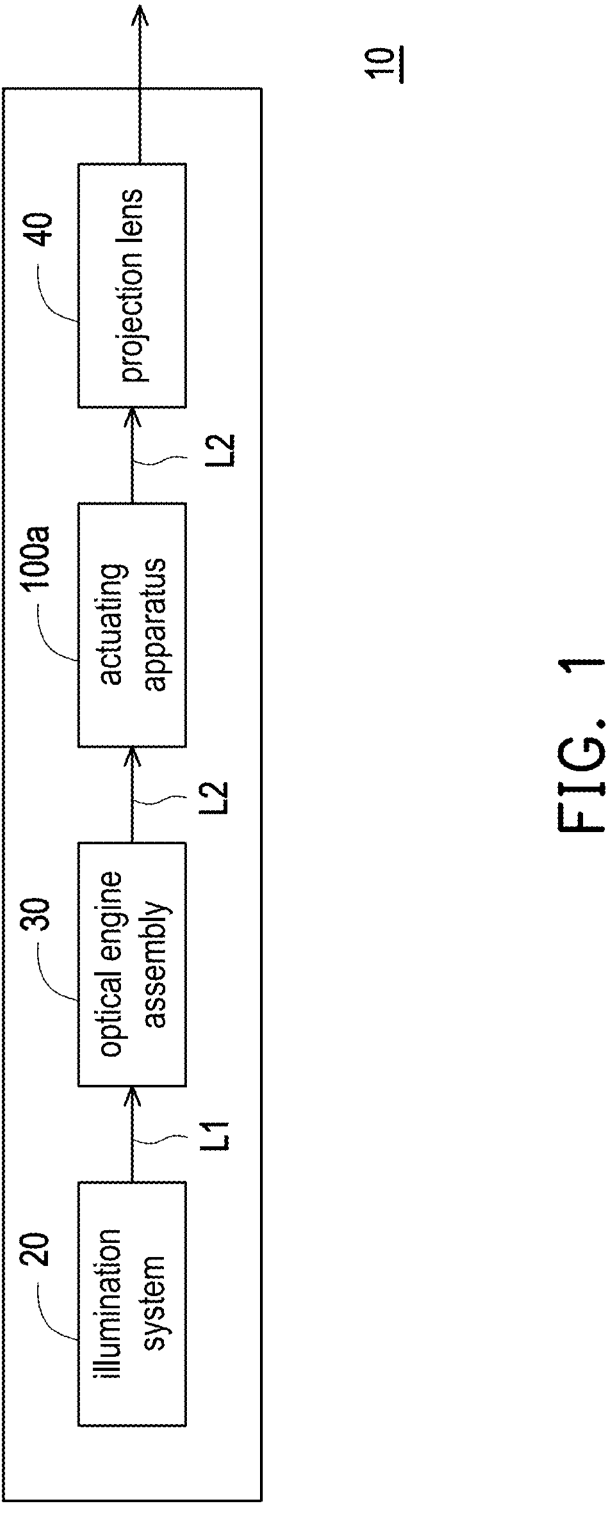
FIG. 1 is a schematic view of a projector according to an embodiment of the disclosure.

FIG. 1 is a schematic view of a projector according to an embodiment of the disclosure. Referring to FIG. 1, in this embodiment, a projector 10 includes an illumination system 20, an optical engine assembly 30, a projection lens 40, and an actuating apparatus 100*a*. The illumination system 20 is configured to provide an illumination light beam L1. The optical engine assembly 30 is configured to convert the illumination light beam L1 into an image light beam L2. The projection lens 40 is configured to project the image light beam L2 from the optical engine assembly 30 outside the projector 10. The actuating apparatus 100*a* is disposed between the optical engine assembly 30 and the projection lens 40, and at least some elements of the actuating apparatus 100*a* are located on a transmission path of the image light beam L2 to guide the image light beam L2 from the optical engine assembly 30 to the projection lens 40.

In detail, the illumination system 20 used in this embodiment has a light emitting element, such as a laser diode (LD) and a laser diode bank. Specifically, any light source that meets the volume requirement can be implemented according to the actual design, and the disclosure is not limited thereto. The illumination system 20 further includes, for example, a combination of one or more units, such as lenses, dichroic mirrors, reflectors, light homogenizing elements (such as fly-eye lenses or integration rods), filter wheels, phosphor wheels, or/and light diffusers, etc., to generate colored light with different wavelength bands, which are transmitted to the optical engine assembly 30 as illumination light beams L1 in different timing sequences or in the same timing sequence. The optical engine assembly 30 is, for example, a combination of a prism, a light valve, and multiple different types of optical elements to receive the illumination light beam L1 provided by the illumination system 20. The prism is, for example, a total internal reflection (TIR) prism, and the light valve is, for example, a reflective light modulator such as a liquid crystal on silicon panel (LCoS panel) and a digital micro-mirror device (DMD). In an embodiment, the light valve may also be a transmissive light modulator such as a transparent liquid crystal panel, an electro-optical modulator, a magneto-optic modulator, and an acousto-optic modulator (AOM), but this embodiment does not limit the form and type of the light valve. The detailed steps and implementation of the method for modulating the illumination light beam L1 into the image light beam L2 by the light valve of the optical engine assembly 30 can be adequately taught, recommended, and implemented by the general knowledge in the technical field, and therefore will not be repeated in the following. In addition, the projection lens 40 includes, for example, a combination of one or more optical lens elements having diopter, such as various combinations of non-planar lenses including biconcave lenses, biconvex lenses, concave-convex lenses, convex-concave lenses, plane-convex lenses, plane-concave lenses, etc. In an embodiment, the projection lens 40 may further include a plane optical lens element to convert the image light beam L2 from the optical engine assembly 30 into a projection light beam in a reflective or transmissive manner, and project the projection light beam outside the projector. The disclosure does not limit the form and type of the projection lens 40.

Figure 2A:
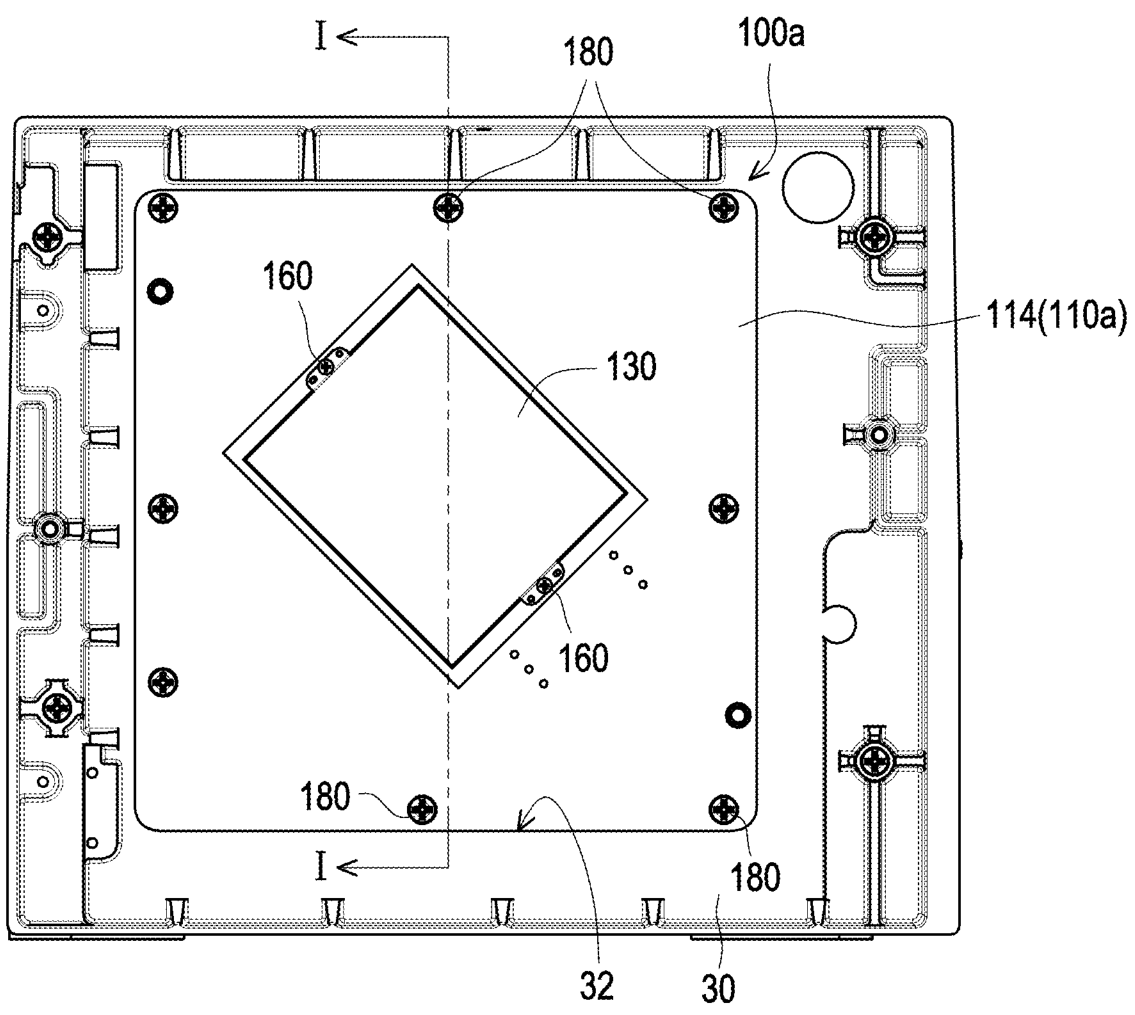
FIG. 2A is a schematic top view of an optical engine assembly and an actuating apparatus of the projector in FIG. 1.
Figure 2B:
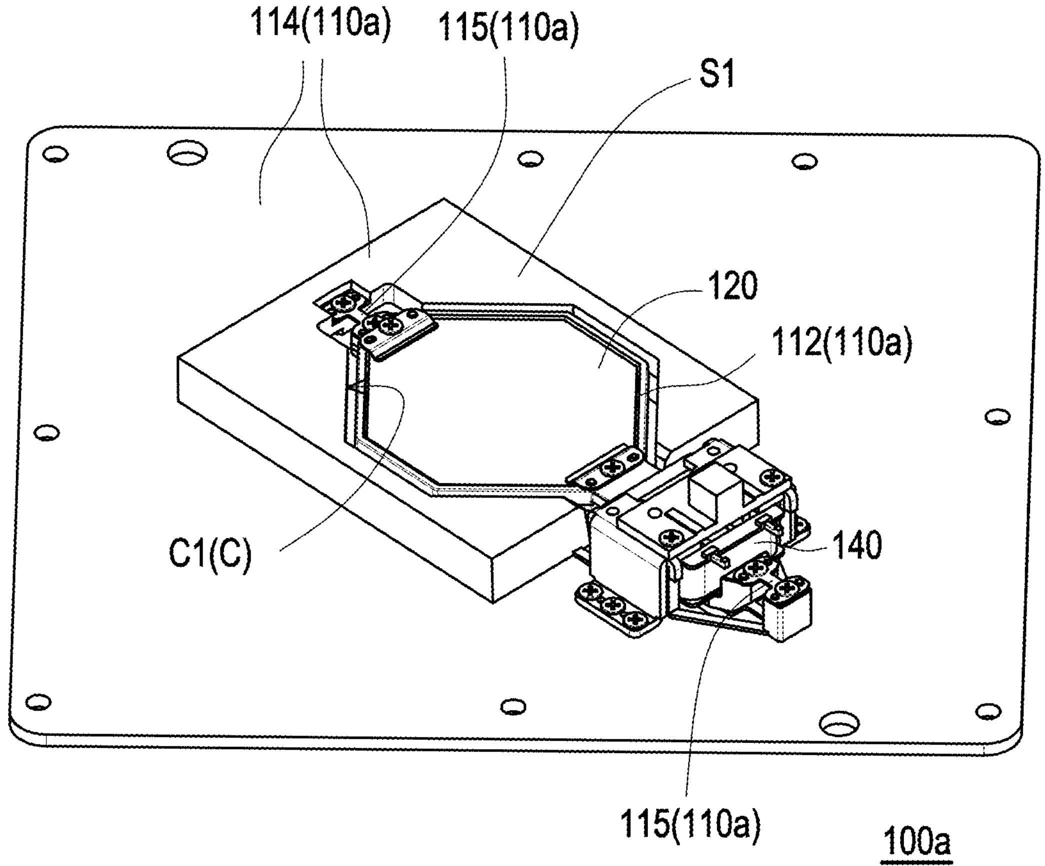
FIG. 2B is a schematic three-dimensional view of the actuating apparatus of FIG. 2A.
Figure 2C:
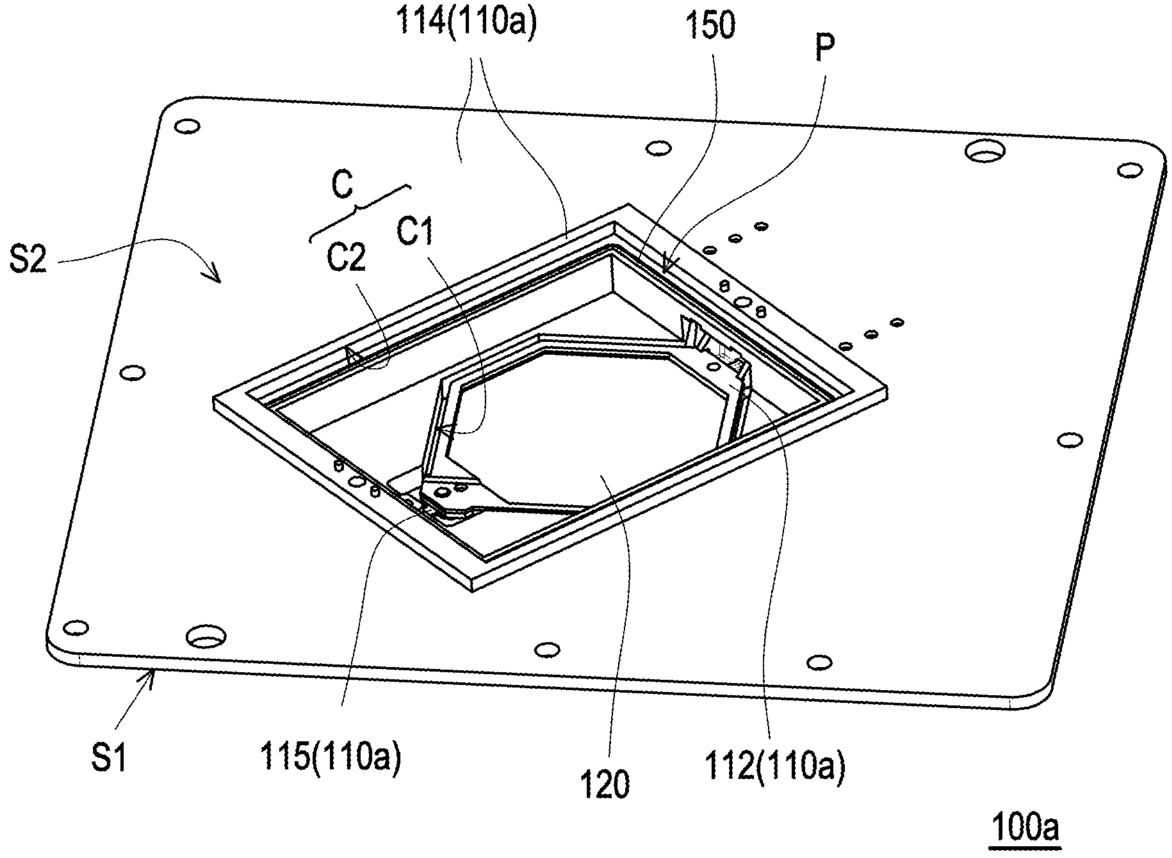
FIG. 2C is a schematic three-dimensional view of the actuating apparatus with a light-transmitting element of the actuating apparatus in FIG. 2A removed.
Figure 2D:
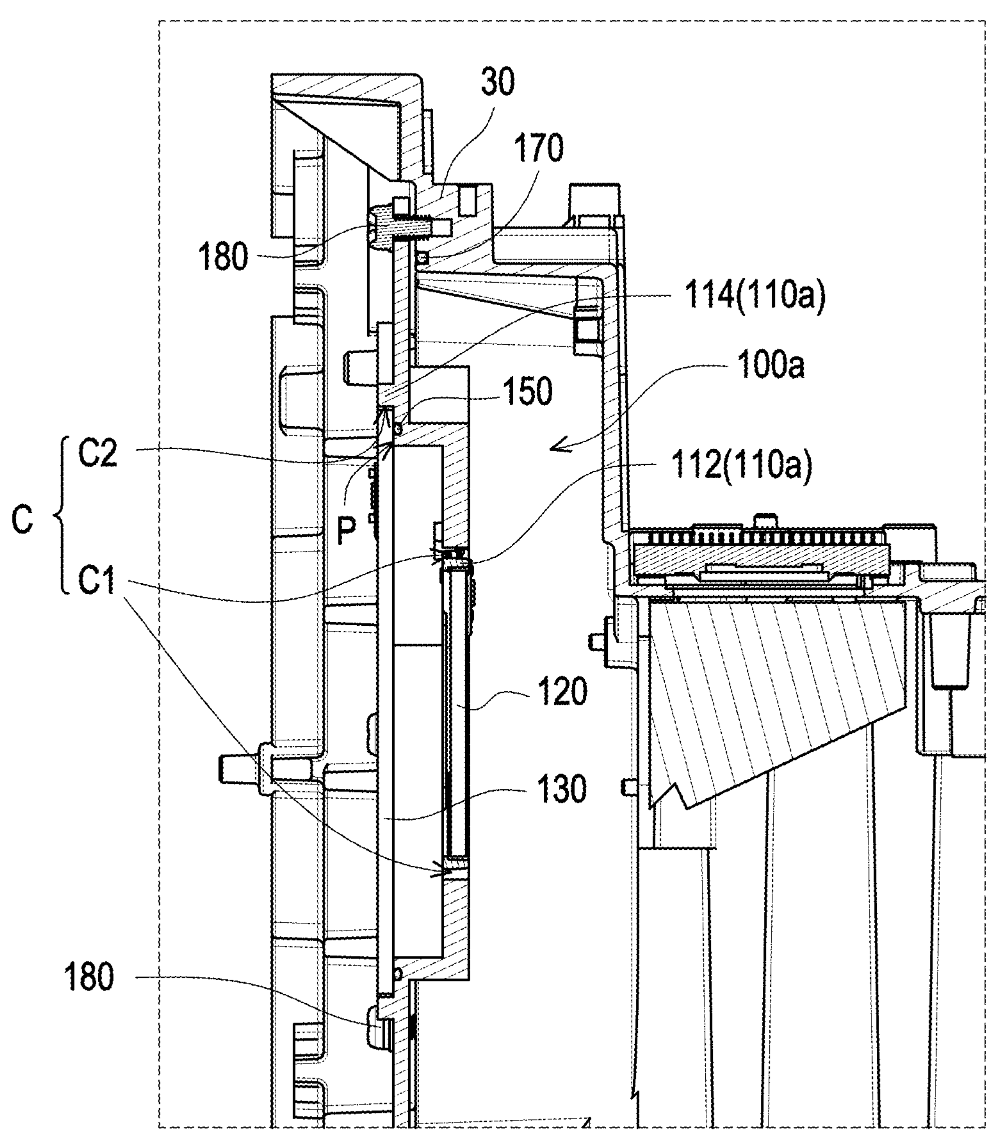
FIG. 2D is a cross-sectional view along a line I-I of FIG. 2A.

FIG. 2A is a schematic top view of an optical engine assembly and an actuating apparatus of the projector in FIG. 1. FIG. 2B is a schematic three-dimensional view of the actuating apparatus of FIG. 2A. FIG. 2C is a schematic three-dimensional view of the actuating apparatus with a light-transmitting element of the actuating apparatus in FIG. 2A removed. FIG. 2D is a cross-sectional view along a line I-I of FIG. 2A.

Referring to FIG. 2A, FIG. 2B, FIG. 2C, and FIG. 2D at the same time. In this embodiment, the actuating apparatus 100*a* includes a frame body 110*a*, an optical element 120, a light-transmitting element 130, and a drive assembly 140. The frame body 110*a* includes a first frame portion 112, a second frame portion 114, and a shaft portion 115. The first frame portion 112 is connected to the second frame portion 114 through the shaft portion 115. The second frame portion 114 has a through hole C. The through hole C has a first opening C1 and a second opening C2. In this embodiment, the first frame portion 112 is located in the first opening C1. In other embodiments, the first frame portion 112 may be disposed in the through hole C and located between the first opening C1 and the second opening C2. The optical element 120 is disposed on the first frame portion 112. In this embodiment, the light-transmitting element 130 is disposed on the second frame portion 114 and is located in the second opening C2 to seal the second opening C2. The image light beam L2 (please refer to FIG. 1) sequentially passes through the optical element 120 located in the first opening C1 and the light-transmitting element 130 located in the second opening C2. That is, the optical element 120 faces the inside of the optical engine, that is, the optical element 120 is closer to the optical engine assembly 30 relative to the light-transmitting element 130 (please refer to FIG. 1), while the light-transmitting element 130 is outside the optical engine, and the light-transmitting element 130 is closer to the projection lens 40 relative to the optical element 120 (please refer to FIG. 1). The second frame portion 114 and the light-transmitting element 130 seal an opening 32 at a light-emitting side of the optical engine assembly 30 (referring to FIG. 2A and FIG. 2D), thereby enabling the actuating apparatus 100*a* to achieve a dust-proof effect inside the optical engine. To further illustrate, the optical engine assembly 30 is, for example, disposed in an optical engine casing (not shown), and the optical engine casing is provided with an opening to allow the image light beam from the light valve to pass from the opening (i.e., the opening 32 at the light-emitting side) of the optical engine casing to the projection lens 40. Here, the light-transmitting element 130 is, for example, transparent glass for dustproofing. The shaft portion 115 is, for example, two elements disposed on the same axis (not shown) and are respectively disposed on two opposite sides of the first frame portion 112 to connect to the second frame portion 114. The drive assembly 140 is disposed on the frame body 110*a*, and the drive assembly 140 drives the first frame portion 112 to rotate with the shaft portion 115 as an axis of rotation, so that the first frame portion 112 drives the optical element 120 to oscillate back and forth relative to the second frame portion 114. Herein, the actuating apparatus 100*a* is a single-axis actuating apparatus, in which the drive assembly 140 includes, for example, a voice coil motor, but is not limited thereto. In this embodiment, a portion of driving elements of the drive assembly 140 is located in the first frame portion 112 (e.g., a coil portion), and another portion of the driving elements is located in the second frame portion 114 (e.g., a magnet and circuit board portion), which further causes the first frame portion 112 to oscillate back and forth with the shaft portion 115 as an axis of rotation under the action of the magnet and the coil.

Furthermore, referring to FIG. 2C again, in this embodiment, the through hole C penetrates a first surface S1 and a second surface S2 of the second frame portion 114, the first opening C1 is an opening located on the first surface S1, and the second opening C2 is an opening located on the second surface S2. Referring to FIG. 2C and FIG. 2D simultaneously, the actuating apparatus 100*a* of this embodiment further includes a dust-proof member 150. An inner wall of the through hole C includes a supporting platform P adjacent to the second opening C2. The supporting platform P extends, for example, toward a center of the through hole C, in which the dust-proof member 150 is disposed between the supporting platform P and the light-transmitting element 130. In more detail, for example, a groove (not shown) is provided on the supporting platform P, and the groove, for example, surrounds the through hole C, and the dust-proof member 150 is, for example, disposed in the groove. Here, the dust-proof member 150 corresponds to the supporting platform P, and is, for example, rectangular or ring-shaped, and is made of, for example, foam or rubber, but not limited thereto. Furthermore, referring to FIGS. 2A and 2D simultaneously, a projector 10 of this embodiment further includes a dust-proof member 170 disposed at the opening 32 at the light-emitting side of the optical engine assembly 30 and is located, for example, between the optical engine casing and the second frame portion 114. Here, the dust-proof member 170 is, for example, rectangular or ring-shaped, and is made of, for example, foam or rubber, but not limited thereto.

In addition, referring to FIG. 2A again, the actuating apparatus 100*a* of this embodiment further includes multiple fixing members 160. The light-transmitting element 130 is fixed to the second frame portion 114 by the fixing members 160. Here, the fixing member 160 is, for example, an elastic sheet, a screw, or a bolt. In addition, the projector 10 further includes multiple fixing members 180. The second frame portion 114 is fixed to the opening 32 at the light-emitting side of the optical engine assembly 30 by the fixing members 180. In this embodiment, the fixing members 180 are, for example, disposed at edges of the second frame portion 140, and in other embodiments may be disposed at other positions of the second frame portion 140, as long as the fixing members 180 do not interfere with the operation of the actuating apparatus 100*a*. Here, the fixing member 180 is, for example, an elastic sheet, a screw, or a bolt.

In short, the provision of the light-transmitting element 130 enables the actuating apparatus 100*a* itself to have a dust-proof effect, which may reduce a component (e.g., a dust-proof cover) in the existing technology and does not need to increase a size of dust-proof glass, thereby effectively reducing costs. In addition, the projector 10 using the actuating apparatus 100*a* of the disclosure may save production costs Other embodiments are listed below for illustration. It should be noted here that the following embodiments use the same or similar numeral references to represent the same or similar elements, and the description of the same technical content is omitted. For descriptions of omitted parts, reference may be made to the foregoing embodiments and will not be repeated in the following embodiments.

Figure 3A:
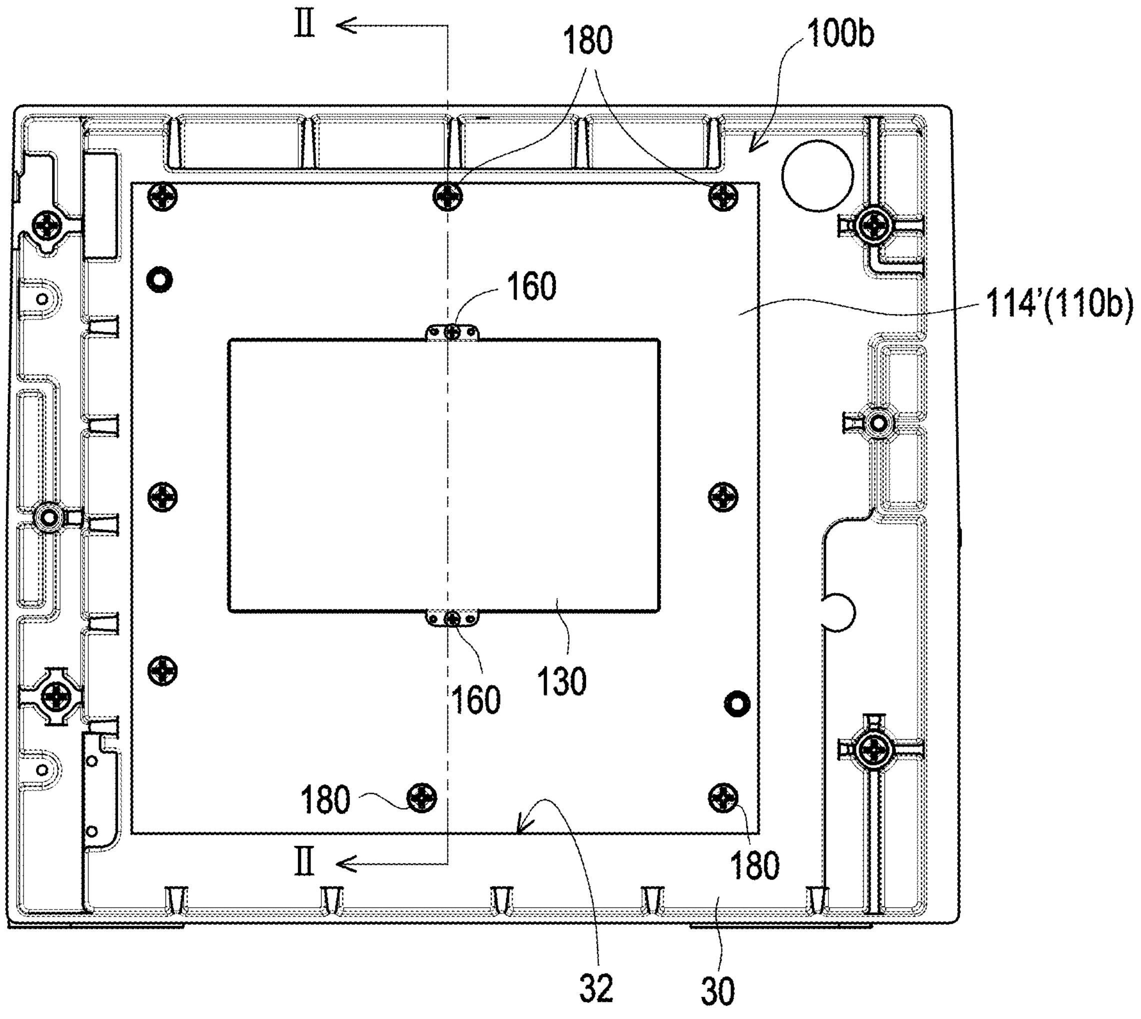
FIG. 3A is a schematic top view of an optical engine assembly and an actuating apparatus according to an embodiment of the disclosure.
Figure 3B:
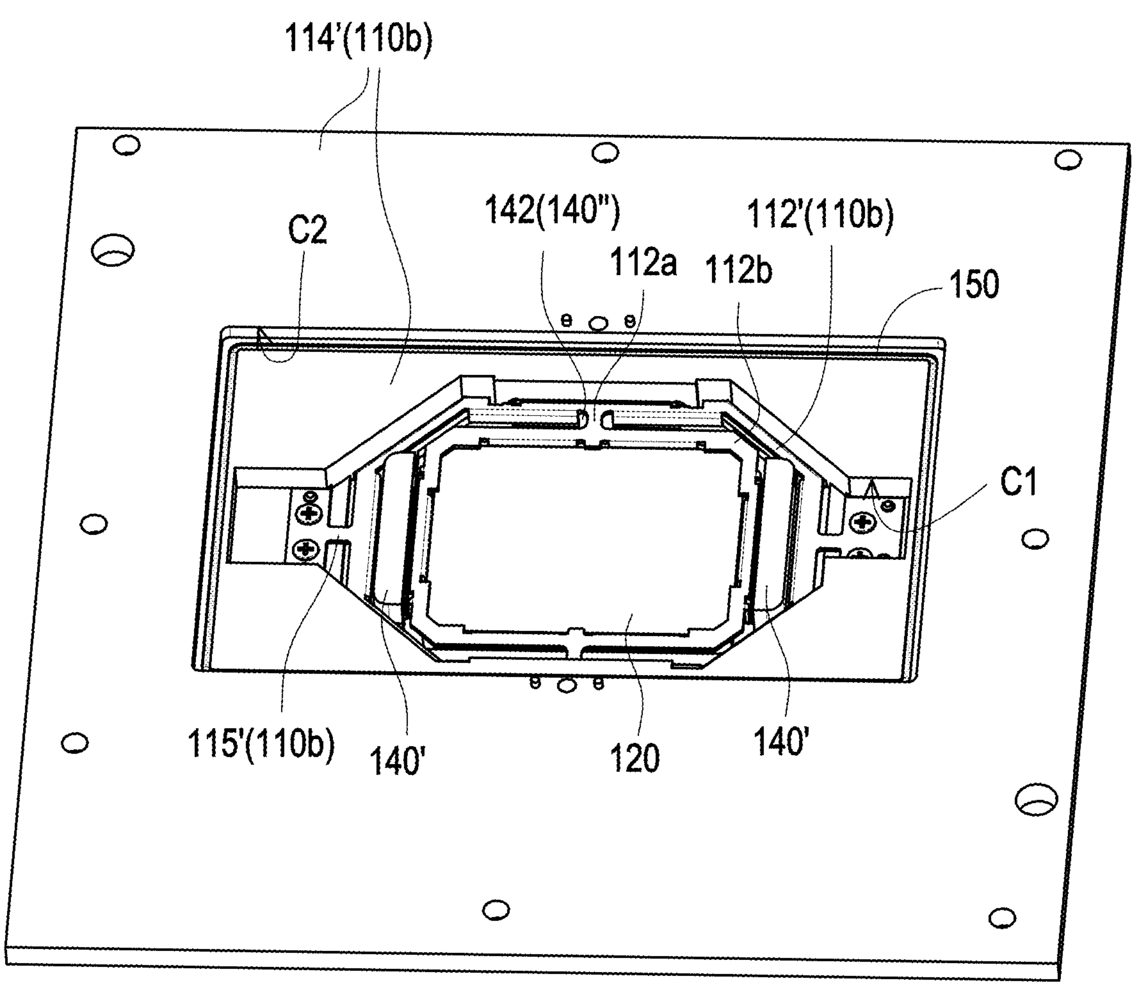
FIG. 3B is a schematic three-dimensional view of the actuating apparatus with a light-transmitting element of the actuating apparatus in FIG. 3A removed.
Figure 3C:
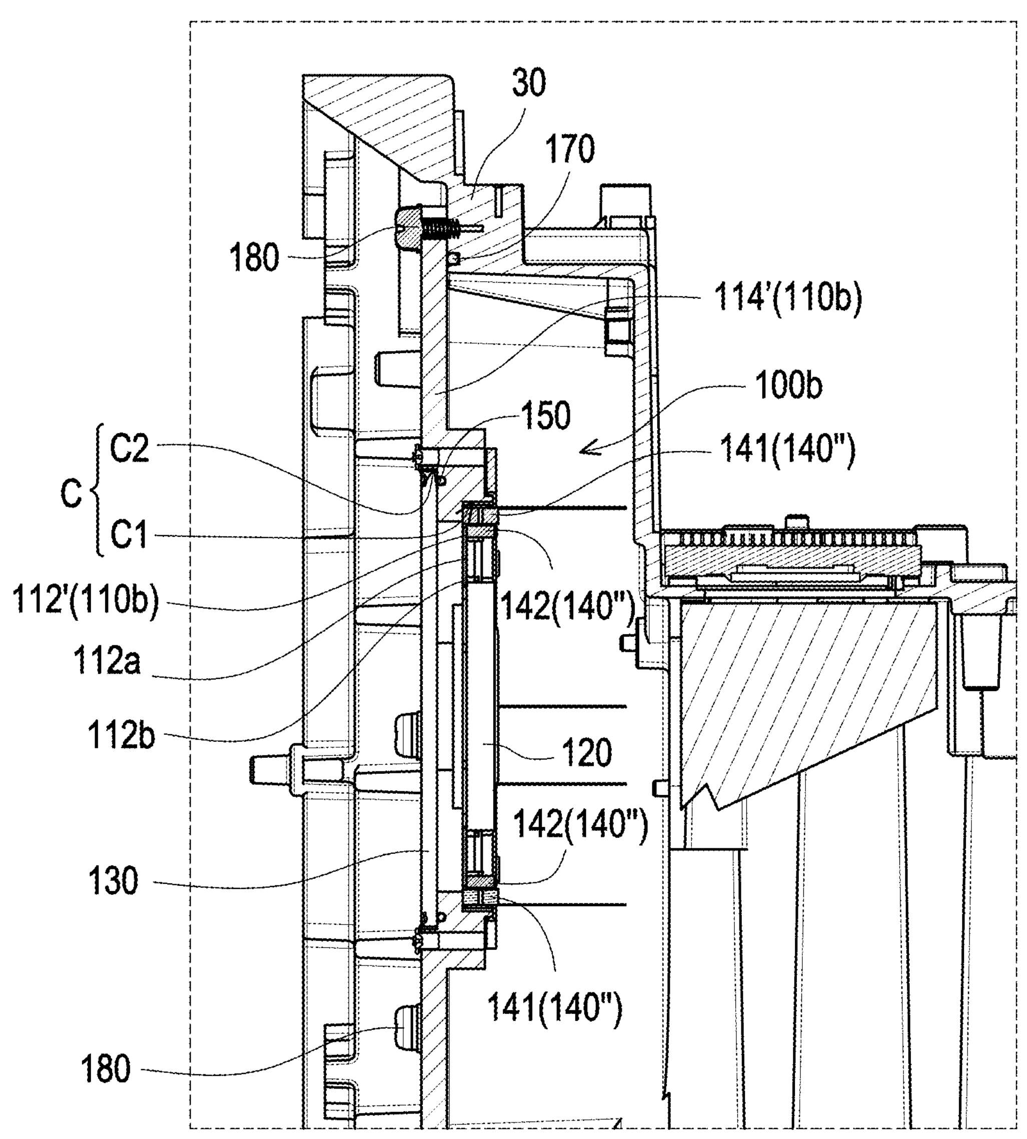
FIG. 3C is a cross-sectional view along a line II-II of FIG. 3A.
Figure 3D:
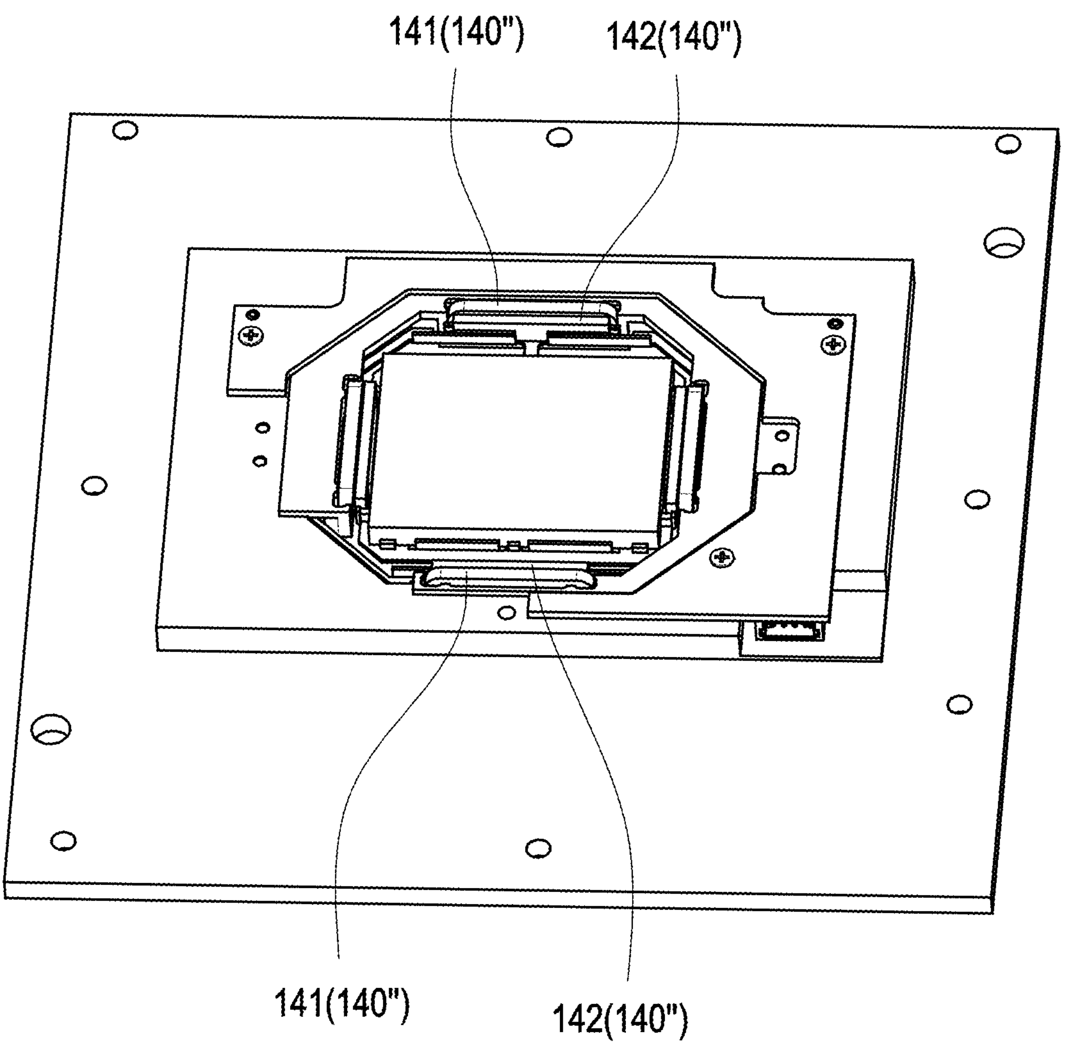
FIG. 3D is a schematic three-dimensional view of another side of FIG. 3B.

FIG. 3A is a schematic top view of an optical engine assembly and an actuating apparatus according to an embodiment of the disclosure. FIG. 3B is a schematic three-dimensional view of the actuating apparatus with a light-transmitting element of the actuating apparatus in FIG. 3A removed. FIG. 3C is a cross-sectional view along a line II-II of FIG. 3A. FIG. 3D is a schematic three-dimensional view of another side of FIG. 3B. Referring to FIG. 2C, FIG. 3A, FIG. 3B, FIG. 3C and FIG. 3D at the same time, an actuating apparatus 100*b* of this embodiment is similar to the actuating apparatus 100*a*, and the main difference between the two is that: in this embodiment, the actuating apparatus 100*b* is an actuating apparatus with a biaxial vibration function, that is, in addition to a shaft portion 115' connected between a first frame portion 112' and a second frame portion 114' of a frame body 110*b* of the actuating apparatus 100*b*, the first frame portion 112' of the frame body 110*b* of the actuating apparatus 100*b* further includes an another shaft portion 112*a* and a frame 112*b*. An optical element 120 is disposed on the frame 112*b*. The another shaft portion 112*a* is, for example, two elements disposed on the same axis (not shown) and are respectively disposed on two opposite sides of the frame 112*b*, and extends from the frame 112*b* and is connected to the first frame portion 112', in which an axis corresponding to the another shaft portion 112*a* and an axis corresponding to the shaft portion 115' are, for example, perpendicular to each other. A drive assembly of the actuating apparatus 100*b* in this embodiment includes, for example, a drive assembly 140' and a drive assembly 140" disposed at different positions. The drive assembly 140" is disposed on the frame body 110*b* and is adjacent to the first frame portion 112'. The drive assembly 140" is configured to drive the first frame portion 112' to rotate with the shaft portion 115' as an axis of rotation, so that the first frame portion 112' drives the frame 112*b* and the optical element 120 located on the frame 112*b* to oscillate back and forth relative to the second frame portion 114'. The drive assembly 140' is disposed on the frame body 110*b* and located between the frame 112*b* and the first frame portion 112'. The drive assembly 140' is configured to drive the frame 112*b* to rotate with the another shaft portion 112*a* as an axis of rotation, so that the frame 112*b* drives the optical element 120 to oscillate back and forth relative to the first frame portion 112'. Here, the actuating apparatus 100*b* is embodied as an actuating apparatus with biaxial actuation, and the drive assemblies (140' and 140") are, for example, voice coil motors or piezoelectric materials, but not limited thereto. In this embodiment, a portion of the driving elements of the drive assemblies (140' and 140") is located in the first frame portion 112' (such as a magnet 142), and another portion of the driving elements is located in the second frame portion 114' (such as a coil 141 and a circuit), which further causes the first frame portion 112' to oscillate back and forth with the shaft portion 115' as an axis of rotation and the frame 112*b* to oscillate back and forth with the another shaft portion 112*a* an axis of rotation under the action of the magnet and the coil. In addition, the first frame portion 112' and the second frame portion 114' of the embodiment have a gap between the first frame portion 112' and the second frame portion 114' except for the portion that is connected by the shaft portion 115', i.e., the first frame portion 112' and the second frame portion 114 are connected only by the shaft portion 115'.

To sum up, the embodiments of the disclosure have at least one of the following advantages or functions. In the design of the actuating apparatus of the disclosure, the optical element is disposed on the first frame portion of the frame body and is located in the first opening. The light-transmitting element is disposed on the second frame portion of the frame body and is located in the second opening to seal the second opening. The provision of the light-transmitting element enables the actuating apparatus itself to have a dust-proof effect, which may reduce a component (e.g., a dust-proof cover) in the existing technology and does not need to increase a size of dust-proof glass, thereby effectively reducing costs. In addition, the projector using the actuating apparatus of the disclosure may save production costs.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable skilled persons in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the invention" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Furthermore, no element and component in the present disclosure is intended to be dedicated to the public regardless of whether the element or component is explicitly recited in the following claims.

What is claimed is:

1. An actuating apparatus configured to allow an image light beam to pass through, the actuating apparatus comprising a frame body, an optical element, a light-transmitting element, and a drive assembly, wherein:

the frame body comprises a first frame portion, a second frame portion, and a shaft portion, the first frame portion is connected to the second frame portion through the shaft portion, the second frame portion has a through hole, the through hole has a first opening and a second opening, and the first frame portion is located in the first opening;

the optical element is disposed on the first frame portion and is located in the first opening;

the light-transmitting element is disposed on the second frame portion and is located in the second opening to seal the second opening, wherein the image light beam sequentially passes through the optical element located in the first opening and the light-transmitting element located in the second opening; and the drive assembly is disposed on the frame body, and the drive assembly drives the first frame portion to rotate with the shaft portion as an axis of rotation, such that the first frame portion drives the optical element to oscillate back and forth relative to the second frame portion.

2. The actuating apparatus according to claim 1 further comprising:

a dust-proof member, wherein an inner wall of the through hole comprises a supporting platform connected to the second opening, and the dust-proof member is disposed between the supporting platform and the light-transmitting element.

3. The actuating apparatus according to claim 1 further comprising:

a plurality of fixing members, wherein the light-transmitting element is fixed to the second frame portion by the fixing members.

4. The actuating apparatus according to claim 3, wherein the fixing members comprise a plurality of elastic sheets, a plurality of screws, or a plurality of bolts.

5. The actuating apparatus according to claim 1, wherein the drive assembly comprises a voice coil motor or a piezoelectric material.

6. The actuating apparatus according to claim 1, wherein the first frame portion further comprises an another shaft portion and a frame, the optical element is disposed on the frame, the another shaft portion extends from the frame and is connected to the first frame portion, and the drive assembly further drives the frame to rotate with the another shaft portion as an axis of rotation, such that the frame drives the optical element to oscillate back and forth relative to the first frame portion.

7. A projector comprising an illumination system, an optical engine assembly, a projection lens, and an actuating apparatus, wherein:

the illumination system is configured to provide an illumination light beam;

the optical engine assembly is configured to convert the illumination light beam into an image light beam;

the projection lens is configured to project the image light beam outside the projector; and the actuating apparatus is disposed between the optical engine assembly and the projection lens to allow the image light beam to pass through, and the actuating apparatus comprises a frame body, an optical element, a light-transmitting element, and a drive assembly, wherein:

the frame body comprises a first frame portion, a second frame portion, and a shaft portion, the first frame portion is connected to the second frame portion through the shaft portion, the second frame portion has a through hole, the through hole has a first opening and a second opening, and the first frame portion is located in the first opening;

the optical element is disposed on the first frame portion and is located in the first opening;

the light-transmitting element is disposed on the second frame portion and is located in the second opening to seal the second opening, wherein the image light beam sequentially passes through the optical element located in the first opening and the light-transmitting element located in the second opening, wherein the second frame portion and the light-transmitting element seal an opening at a light-emitting side of the optical engine assembly; and the drive assembly is disposed on the frame body, and the drive assembly drives the first frame portion to rotate with the shaft portion as an axis of rotation, such that the first frame portion drives the optical element to oscillate back and forth relative to the second frame portion.

8. The projector according to claim 7, wherein the actuating apparatus further comprises:

a dust-proof member, wherein an inner wall of the through hole comprises a supporting platform connected to the second opening, and the dust-proof member is disposed between the supporting platform and the light-transmitting element.

9. The projector according to claim 7, wherein the actuating means further comprises:

a plurality of fixing members, wherein the light-transmitting element is fixed to the second frame portion by the fixing members.

10. The projector according to claim 9, wherein the fixing members comprise a plurality of elastic sheets, a plurality of screws, or a plurality of bolts.

11. The projector according to claim 7, wherein the drive assembly comprises a voice coil motor or a piezoelectric material.

12. The projector according to claim 7 further comprising:

a dust-proof member disposed between the opening at the light-emitting side of the optical engine assembly and the second frame portion.

13. The projector according to claim 7 further comprising:

a plurality of fixing members, wherein a periphery of the second frame portion is fixed to the opening at the light-emitting side of the optical engine assembly by the fixing members.

14. A projector according to claim 7, wherein the first frame portion further comprises an another shaft portion and a frame, the optical element is disposed on the frame, the another shaft portion extends from the frame and is connected to the first frame portion, and the drive assembly further drives the frame to rotate with the another shaft portion as an axis of rotation, such that the frame drives the optical element to oscillate back and forth relative to the first frame portion.

* * * * *